Figure 1:
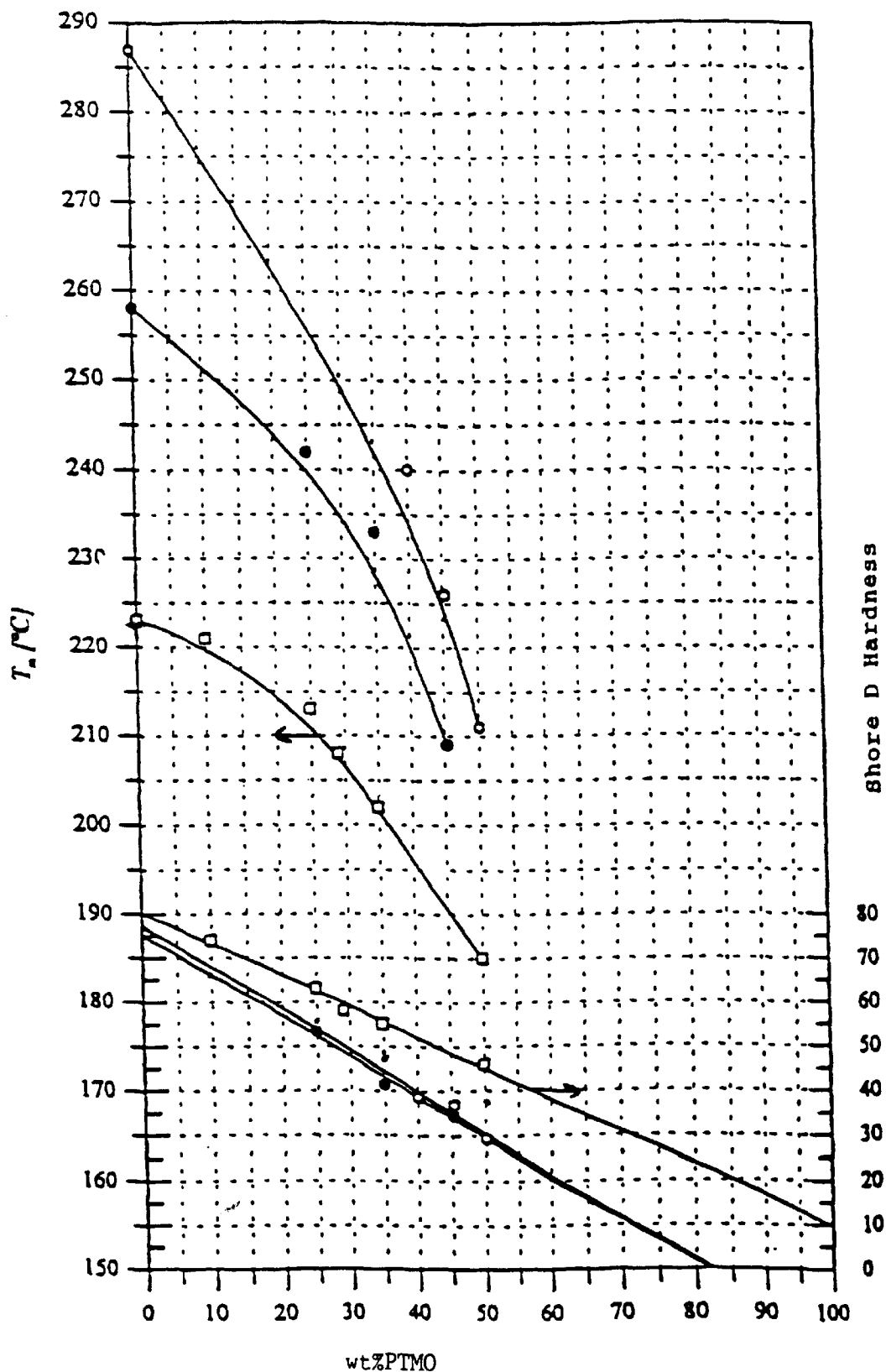

United States Patent [19]
Buning et al.

[11] Patent Number: 6,046,302
[45] Date of Patent: Apr. 4, 2000

[54] COPOLYETHERESTER

[75] Inventors: Gerard H. Werumeus Buning, Schinnen; Ivan Vulic, Beek, both of Netherlands

[73] Assignee: DSM N.V., Geleen, Netherlands

[21] Appl. No.: 08/904,843

[22] Filed: Aug. 1, 1997

Related U.S. Application Data

[63] Continuation of application No. PCT/NL96/00041, Jan. 23, 1996.

[30] Foreign Application Priority Data

Feb. 3, 1995 [BE] Belgium ................................ 9500082

[51] Int. Cl.$^7$ ..................................................... C08G 63/02
[52] U.S. Cl. ........................... 528/272; 528/298; 528/308; 528/308.6; 528/308.7; 428/36.9; 525/437
[58] Field of Search ...................... 528/272, 298, 528/308, 308.6, 308.7; 428/36.9; 525/437

[56] References Cited

U.S. PATENT DOCUMENTS

| | | | |
|---|---|---|---|
| 4,292,151 | 9/1981 | Inata et al. | 204/159.15 |
| 4,937,314 | 6/1990 | Greene | 528/272 |
| 5,116,937 | 5/1992 | Greene | 528/272 |
| 5,128,185 | 7/1992 | Greene | 428/36.9 |
| 5,162,455 | 11/1992 | Greene | 525/437 |

*Primary Examiner*—Terressa Mosley
*Attorney, Agent, or Firm*—Pillsbury Madison & Sutro LLP

[57] ABSTRACT

The invention relates to a novel copolyether-ester containing hard segments derived from at least one low-molecular-weight glycol and at least two dicarboxylic acids, or esters thereof, chosen from the group comprising 2,6-naphthalenedicarboxylic acid, 4,4'-diphenyldicarboxylic acid and terephthalic acid, which contains, if desired, isophthalic acid, and containing soft segments derived from the group comprising poly(alkylene oxides).

The copolyetherester according to the invention has improved properties at high temperature while retaining the properties at low temperature.

9 Claims, 2 Drawing Sheets

COPOLYETHERESTER

This is a Continuation of International Appln. No. PCT/NL96/00041 filed Jan. 23, 1996 which designated the U.S.

The invention relates to a copolyetherester having improved properties at high temperature.

Copolyetheresters are used in motor vehicles at various points under the engine hood. As a result of increasing demands as regards streamlining and larger interiors with the same external dimensions, ever less space is a available under the engine hood. Consequently the temperature can rise considerably locally as a result of a lack of adequate cooling facilities. As a consequence of this, the materials used underneath the engine hood have to be resistant to ever higher temperature and must retain their specific properties at these high temperatures. In addition, the properties at lower temperatures must, of course, remain at least at the same level. The copolyetheresters currently available commercially have the disadvantage that they cannot fulfil all the increased requirements.

The object of the invention therefore is to provide a copolyetherester having improved properties at high temperature without adversely affecting the properties at low temperature.

The object of the invention is achieved with a copolyetherester having hard segments derived from at least one low-molecular-weight glycol and at least two dicarboxylic acids, or esters thereof, chosen from the group comprising 2,6-naphthalenedicarboxylic acid, 4,4'-diphenyldicarboxylic acid and terephthalic acid, and containing soft segments derived from the group comprising poly(alkylene oxides).

Preferably, the at least two dicarboxylic acids are 2,6-naphthalenedicarboxylic acid and 4,4'-diphenyldicarboxylic acid or 4,4'-diphenyldicarboxylic acid and terephthalic acid.

FIG. 1 graphically depicts a comparison between copolyetheresters according to the invention and a commercially available product.

Figure 2:
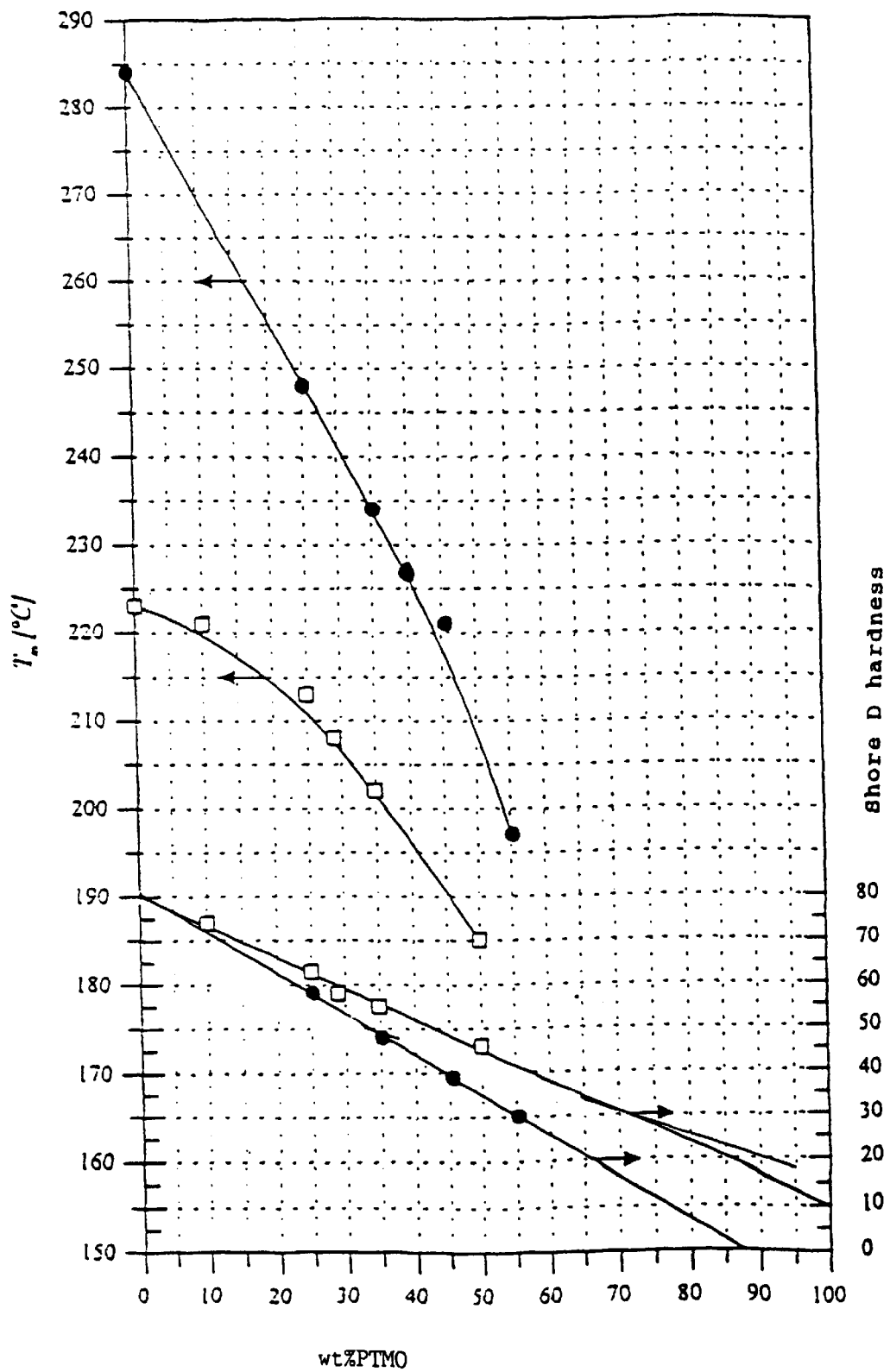

FIG. 2 graphically depicts comparison between copolyetheresters according to the present invention and a commercially available copolyetherester.

The low-molecular-weight glycol has a molecular eight which is below approximately 300. Preferably, the low-molecular-weight glycol is an alkylene glycol containing 2–6 carbon atoms in the alkylene chain. Very surprising results are achieved if the alkylene glycol is ethylene glycol.

The soft segments are preferably made up of polyether diols of which the repeating ether units, —R—O—, have been chosen from the group containing R=$(CH_2)_2$,

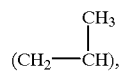

$(CH_2)_3$ or $(CH_2)_4$ or a combination thereof. Preferably, R=$(CH_2)_4$.

The molecular weight of the soft segments may vary within wide limits, for example between 400 and 6000, preferably between 400 and 3000, and with still greater preference between 500 and 2000. The greatest preference is for a molecular weight between 600 and 1500.

The content of soft segments may vary within wide limits, for example between 10 and 90% by weight, preferably between 15 and 70% by weight, and with more preference between 25 and 60% by weight.

If, in the case where the at least two dicarboxylic acids are terephthalic acid and 2,6-naphthalenedicarboxylic acid, a high rate of crystallization is desired, then the terephthalic acid content chosen is preferably below 50 mol %, based on the total of the at least two dicarboxylic acids. It is furthermore advantageous to choose a content of 2,6-naphthalenedicarboxylic acid that is lower than 70 mol %.

U.S. Pat. No. 3,775,375 describes copolyetheresters based on 2,6-naphthalenedicarboxylic acid and an alkalene glycol and poly(alkylene oxide glycol). In addition to the 2,6-naphthalenedicarboxylic acid, a second dicarboxylic acid may also be present in a minor amount. Among the more than forty possible second dicarboxylic acids specifically mentioned are 4,4'-diphenyl-dicarboxylic acid and terephthalic acid. The examples are all limited to 2,6-naphthalenedicarboxylic acid. The description gives no indication at all of a possible effect due to the presence of a second dicarboxylic acid.

The copolyetherester according to the invention can be obtained by known methods for polyetherester block copolymers. The polyetherester block copolymers are generally prepared by two-stage in the melt transesterification of the dicarboxylic acid or the dimethyl ester thereof, the poly(alkylene ether) glycol and the low-molecular-weight diol. Both laboratory-scale and commercial production-scale methods are described, inter alia, in Encyclopedia of Polymer Science and Technology, vol. 12, pages 77–79 and pages 84–85 (1988) and the references cited therein.

The preparation of the copolyetherester according to the invention is based not on one diacid but, rather, on the combination of at least two dicarboxylic acids in the desired stoichiometry.

The customary catalysts, for example $Sb_2O_3$ or titanates, are used, as are the customary stabilizers, for example hindered phenols or secondary aromatic amines.

To increase the melt viscosity, a minor amount of a compound containing more reactive groups, for example trimethylolpropane or pentaerythritol or a diisocyanate or trimellitic anhydride, may be added, if desired, at the end of the polymerization.

EXAMPLE I

To synthesize copolyetheresters based on terephthalic acid and 4,4-diphenyldicarboxylic acid, 0.5 mol of dimethyl terephthalate (DMT) (99%, $T_m$=140–142° C. supplied by Hüls AG), 0.75 mol of dimethyl-4,4'-diphenyldicarboxylate (DMBE) (99%, $T_m$=217° C. supplied by Monsanto Technical Center), 0.097 mol of poly(tetramethylene oxide) (PTMO) (Polymer® 1000 having a mean molecular mass of 950–1050 supplied by Quaker Oats Chemicals), 2.79 mol of ethylene glycol (EG) (fibre quality, $T_{b.pt.}$=196–198° C. supplied by BASF), 0.50% Irganox® 1330 supplied by the company Ciba Geigy and 350 ppm of $MnAcetate.4H_2O$ were heated for approximately 2 hours at 200° C. in a glass reactor, the methanol formed being distilled off.

Phosphorus ethylene glycol ether ester, 0.12 g, and antimony trioxide, 0.09 g, dissolved in ethylene glycol were added and the temperature was increased to 278° C. The pressure was gradually lowered to 160 Pa and the polymerization was carried out over a total period of approximately 1.5 hours. The torque measured on the stirrer increased from 0.01 to 1 Nm.

The clear, viscous melt was then removed from the reactor via a stopcock in the bottom by means of overpressure. The clear polymer filament was cooled in a water bath and chopped into pieces.

After drying, approximately 260 g of copolyetherester were obtained.

EXAMPLES II–IV

Copolyetheresters having different ratios between the constituent monomers were prepared in the same way. The compositions are given in Table 1. The compositions were moulded into small test rods for the purpose of dynamic mechanical analysis over the range from −150° C. to the melting point with a heating rate of 2° C./min and at 0.2 Hz using a torsion-pendulum apparatus. The melting point ($T_m$) and crystallization point ($T_c$) were determined from the first and second heating curve and the first cooling curve, respectively, at a heating and cooling rate, respectively, of 20° C./min. Shore D hardness was measured according to ISO-R868 using a Zwick Shore D apparatus (type 1008.56a).

TABLE 1

| Example | DMT/DMB mol\mol | Soft segment wt. % | $\eta^*_{rel}$ | $T_m^1$ °C. | $T_c$ °C. | $T_m^2$ °C. | $T_g$ °C. | Shore D |
|---|---|---|---|---|---|---|---|---|
| I | 4/6 | 25 | 1.91 | 239 | 210 | 243 | −57 | 53 |
| II | 4/6 | 35 | 1.87 | 238 | 216 | 233 | −60 | 41.5 |
|   |     |    | 2.32** |     |     |     |     |     |
| III | 4/6 | 45 | 2.34 | 211 | 193 | 209 | −58 | 34.5 |
| IV | 3/7 | 40 | 1.79 | 239 | 215 | 240 | −64 | 39 |
| V | 3/7 | 45 | 2.26 | 225 | 199 | 226 | −61 | 37.0 |
| VI | 3/7 | 50 | 2.17 | 213 | 201 | 211 | −67 | 29 |

*relative viscosity measured on 1 g in 100 g of m-cresol at 25° C.
**after 24 hours of postcondensation at 215° C. and 370 Pa under $N_2$ From Table 1 it appears, very surprisingly, that $T_m^2$ and $T_c$ differ on average only by 21° C., as a result of which great advantages arise in injection-moulding applications compared with customary copolyetheresters based on poly(butylene terephthalate) and poly(tetramethylene oxide), for which $T_m-T_c$ is in the order of 60° C.; inter alia, resulting in a smaller postshrinkage.

The melting point of the copolyetherester according to the invention from Table 1 is 25 to 40° higher than that of copolyetheresters based on PBT and PTMO having a comparable content of soft segment. To achieve the same Shore D hardness, less soft segment seems to be necessary in the copolyetherester according to the invention, which has a positive effect on the chemical resistance.

This is indicated in FIG. 1.

The curves having open circles relate to Examples I–III, those having filled-in circles to Examples IV–VI and those having open squares to the commercial product Arnitel E® supplied by the company DSM, which is a copolyetherester based on PBT/PTMO.

From the torsion damping measurements, it furthermore appears that, in many cases, a good rigidity is maintained up to temperatures above 175° C. for copolyetheresters of the invention having a PTMO content of 45% by weight.

EXAMPLES VII–XIII

Copolyetheresters were prepared in the same way as described under Example I, dimethyl-2,6-naphthalenedicarboxylate (NDC) (>99.9%, $T_m$=190° C.) supplied by Amoco Chemical Company being used instead of the dimethyl terephthalate.

The chosen NDC/DMB molar ratio was 1:1, and the amounts of PTMO and EG or butanediol (BD) were varied so that copolyetheresters having different contents of soft segment were formed. Small test rods were also moulded from these copolyetheresters and the properties were determined in the same way as in Examples I–VI.

The various copolyetherester compositions and the properties are presented in Table 2.

TABLE 2

| Example | Soft segment wt. % | $\eta_{rel}$ | $T_m^1$ °C. | $T_c$ °C. | $T_m^2$ °C. | $T_g$ °C. | Shore D |
|---|---|---|---|---|---|---|---|
| VII | 25 | 1.951 | 253 | 204 | 248 | −65/+44 | 58 |
| VIII | 35 | 1.78 | 231 | 204 | 234 | −59 | 48 |
| IX*** | 40 | 1.89 | 225 | 196 | 227 | −58 | 44 |
|     |    | 3.53 | 240 | 194 | 235 | n.d.** | n.d.** |
| X | 46 | 2.03 | 216 | 184 | 221 | −60 | 39 |
| XI | 50 | 2.30 | 206 | 179 | 209 | −62 | 33 |
| XII | 55 | 2.51 | 189 | 131 | 197 | −60 | 30 |
| XIII* | 43 | 2.92 | 176 | 126 | 180 | −61 | 32 |

*Units based on butanediol instead of ethylene glycol in the hard segments
**Not determined
***IX postcondensed at 205° C. and 50 Pa, $N_2$, for 24 hours.

In Example VII, a wide glass transition range occurs between −65 and +44° C., whereas there is a well-defined glass transition in the other examples, which glass transition is dependent on the content of soft segment only to a very small extent.

In FIG. 2, a comparison is made in the same way as in FIG. 1 with a copolyetherester ARNITEL E supplied by DSM.

In a comparative experiment, the composition of U.S. Pat. No. 3,775,375, based on 2,6-naphthalenedicarboxylic acid as sole diacid, butanediol and poly(tetramethylene oxide) glycol, was produced with 20 and 35% by weight soft segment.

The difference $T_m-T_c$ is in this case approximately 45 and 65° C., respectively, as a result of which these copolyetheresters are less suitable for injection-moulding applications.

In addition to a high melting point, this copolyetherester is found to have a higher glass transition temperature, as a result of which the properties at low temperature are infer or compared with those of the current polyetheresters.

The copolyetheresters of the invention combine a high melting point with excellent properties at low temperature. Compared with copolyetheresters based on poly(butylene terephthalate) as hard segment and poly(ether polyols) as soft segment, the copolyetheresters according to the invention have a better thermal oxidation stability, a better hydrolysis stability and a better UV stability.

The copolyetherester according to the invention can be used for spinning fibres, making films and moulding from the melt, for example by means of injection moulding and extrusion.

For this purpose, the polyetherester may contain various customary additives, for example stabilizers, colouring agents, flame-retarding materials, fillers, for example talcum, mica or clay, reinforcing materials, for example fibres of, inter alia, glass, carbon and aramids; and, if desired, other polymers.

We claim:

1. A copolyetherester comprising hard segments derived from at least one known alkylene glycol having a molecular weight of less than 300 and at least two dicarboxylic acids, or esters thereof, wherein said at least two dicarboxylic acids are members selected from 2,6-naphthalene-dicarboxylic acid, 4,4'-diphenyldicarboxylic acid, terephthalic acid or isophthalic acid, and further comprising between 15 wt. % and 70 wt. % soft segments derived from poly(alkylene oxides).

2. Copolyetherester according to claim 1, characterized in that the content of each of the dicarboxylic acids is less than 70 mol % of the total dicarboxylic acid content.

3. The copolyetherester according to claim 1, wherein the known alkylene glycol has 2–6 carbons in the alkylene chain.

4. Copolyetherester according to claim 3, characterized in that the alkylene glycol is ethylene glycol.

5. The copolyetherester according to claim 1, wherein the poly(alkylene oxide) comprises poly(tetramethylene oxide).

6. The copolyetherester according to claim 1, wherein the at least two dicarboxylic acids comprise 2,6-naphthalenedicarboxylic acid and 4,4'-diphenyldicarboxylic acid.

7. Copolyetherester according to one of claims 1–5, characterized in that the at least two dicarboxylic acids are terephthalic acid and 4,4'-diphenyldicarboxylic acid.

8. A product containing the copolyetherester according to claim 1.

9. The copolyetherester according to claim 1, wherein said at least two dicarboxylic acids comprise terephthalic acid and isophthalic acid.

\* \* \* \* \*